United States Patent
McCaffrey et al.

(10) Patent No.: US 12,454,911 B2
(45) Date of Patent: Oct. 28, 2025

(54) BLEEDING CORE AIR FROM A TURBINE ENGINE CORE FLOWPATH

(71) Applicant: RTX Corporation, Farmington, CT (US)

(72) Inventors: Michael G. McCaffrey, Windsor, CT (US); Mark F. Zelesky, Bolton, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/400,329

(22) Filed: Dec. 29, 2023

(65) Prior Publication Data

US 2025/0215827 A1     Jul. 3, 2025

(51) Int. Cl.
    *F01D 25/12*      (2006.01)
    *F01D 17/10*      (2006.01)
    *F02C 7/18*      (2006.01)

(52) U.S. Cl.
    CPC .............. *F02C 7/18* (2013.01); *F01D 17/105* (2013.01); *F01D 25/12* (2013.01); *F05D 2220/323* (2013.01); *F05D 2260/232* (2013.01); *F05D 2260/606* (2013.01)

(58) Field of Classification Search
    CPC .......... F01D 17/105; F01D 25/12; F02C 7/18; F05D 2220/323; F05D 2260/232; F05D 2260/606
See application file for complete search history.

(56) References Cited

U.S. PATENT DOCUMENTS

| | | | |
|---|---|---|---|
| 5,261,228 A * | 11/1993 | Shuba | F01D 17/105 60/226.3 |
| 6,499,285 B1 | 12/2002 | Snyder | |
| 9,046,056 B2 | 6/2015 | Lerg | |
| 10,138,904 B2 * | 11/2018 | Pearson | B64D 33/02 |
| 11,692,481 B1 * | 7/2023 | Remy | F02C 7/052 415/121.2 |
| 2014/0109589 A1 * | 4/2014 | Pritchard, Jr. | F02C 6/08 60/785 |
| 2014/0119891 A1 | 5/2014 | Schmittenberg | |
| 2014/0245747 A1 * | 9/2014 | Pritchard, Jr. | F04D 27/0215 60/785 |

(Continued)

OTHER PUBLICATIONS

EP Search Report for EP Patent Application No. 24223766.7 dated May 26, 2025.

*Primary Examiner* — Nathaniel E Wiehe
*Assistant Examiner* — Theodore C Ribadeneyra
(74) *Attorney, Agent, or Firm* — Getz Balich LLC

(57) ABSTRACT

An assembly is provided for a turbine engine. This assembly includes an engine core configured to drive rotation of a propulsor rotor. The engine core includes a first compressor section, a second compressor section, a flowpath, a bleed port, an inner passage and an outer passage. The first compressor section and the second compressor section are arranged axially along an axis. The flowpath extends longitudinally through the first compressor section and the second compressor section. The bleed port fluidly couples the flowpath to the inner passage and the outer passage in parallel. The bleed port is located longitudinally along the flowpath between the first compressor section and the second compressor section. The inner passage is arranged radially between the flowpath and the outer passage.

18 Claims, 3 Drawing Sheets

(56) References Cited

U.S. PATENT DOCUMENTS

| | | | |
|---|---|---|---|
| 2016/0265442 A1* | 9/2016 | Beecroft | F02C 9/18 |
| 2016/0326957 A1 | 11/2016 | Feulner | |
| 2017/0167273 A1* | 6/2017 | Maguire | F01D 11/24 |
| 2020/0040847 A1* | 2/2020 | Filipenco | F01D 25/24 |
| 2022/0074426 A1 | 3/2022 | Schugardt | |
| 2022/0252008 A1 | 8/2022 | Sibbach | |
| 2023/0143283 A1* | 5/2023 | Sharma | F02C 7/185 |
| | | | 415/173.2 |
| 2023/0250763 A1* | 8/2023 | Mirmohammadi Ghoojdi | |
| | | | F02C 9/18 |
| | | | 60/785 |

* cited by examiner

BLEEDING CORE AIR FROM A TURBINE ENGINE CORE FLOWPATH

BACKGROUND OF THE DISCLOSURE

1. Technical Field

This disclosure relates generally to an aircraft and, more particularly, to bleeding air from a flowpath of an aircraft engine.

2. Background Information

Various systems and methods are known in the art for bleeding air from a flowpath of an aircraft engine. While these known systems and methods have various benefits, there is still room in the art for improvement.

SUMMARY OF THE DISCLOSURE

According to an aspect of the present disclosure, an assembly is provided for a turbine engine. This assembly includes an engine core configured to drive rotation of a propulsor rotor. The engine core includes a first compressor section, a second compressor section, a flowpath, a bleed port, an inner passage and an outer passage. The first compressor section and the second compressor section are arranged axially along an axis. The flowpath extends longitudinally through the first compressor section and the second compressor section. The bleed port fluidly couples the flowpath to the inner passage and the outer passage in parallel. The bleed port is located longitudinally along the flowpath between the first compressor section and the second compressor section. The inner passage is arranged radially between the flowpath and the outer passage.

According to another aspect of the present disclosure, another assembly is provided for a turbine engine. This assembly includes an engine core, and the engine core includes a first rotating assembly, a second rotating assembly, a flowpath, a bleed port, an inner passage and an outer passage. The first rotating assembly is rotatable about an axis and includes a mixed flow compressor rotor. The second rotating assembly is rotatable about the axis and includes a second compressor rotor. The flowpath extends longitudinally across the mixed flow compressor rotor and the second compressor rotor. The bleed port fluidly couples the flowpath to the inner passage and the outer passage in parallel. The bleed port is located longitudinally along the flowpath between the mixed flow compressor rotor and the second compressor rotor. The inner passage is arranged radially between the flowpath and the outer passage.

According to still another aspect of the present disclosure, another assembly is provided for a turbine engine. This assembly includes an engine core, and the engine core includes a compressor section, a flowpath, a bleed port, an outer passage and an inner passage disposed radially between the flowpath and the outer passage. The flowpath extends longitudinally through the compressor section. The flowpath includes a first flowpath section and a second flowpath section. The first flowpath section extends longitudinally to the second flowpath section. The second flowpath section extends longitudinally from the first flowpath section to the compressor section. An outer peripheral boundary of the flowpath extends radially outward along the first flowpath section to an outer boundary apex and then extends radially inward along the second flowpath section from the outer boundary apex. An inner peripheral boundary of the flowpath extends radially outward along the first flowpath section to an inner boundary apex and then extends radially inward along the second flowpath section from the inner boundary apex. The bleed port fluidly couples the flowpath to the inner passage and the outer passage in parallel. The bleed port is arranged along the outer peripheral boundary of the flowpath downstream of the outer boundary apex. The bleed port is located radially outboard of the inner boundary apex.

The compressor section may be a high pressure compressor section. The engine core may also include a low pressure compressor section. The flowpath may also extend longitudinally through the low pressure compressor section. The first flowpath section and the second flowpath section may be arranged longitudinally between the low pressure compressor section and the high pressure compressor section.

The engine core may also include a rotating assembly with a mixed flow compressor rotor in the low pressure compressor section.

The flowpath may include a first flowpath section and a second flowpath section. The first flowpath section may extend longitudinally from the first compressor section to the second flowpath section. The second flowpath section may extend longitudinally from the first flowpath section to the second compressor section. An outer peripheral boundary of the flowpath may extend radially outward along the first flowpath section to an outer boundary apex and may then extend radially inward along the second flowpath section from the outer boundary apex. The bleed port may be arranged along the outer peripheral boundary of the flowpath downstream of the outer boundary apex.

The bleed port may be located radially inboard of the outer boundary apex.

An inner peripheral boundary of the flowpath may extend radially outward along the first flowpath section to an inner boundary apex and may then extend radially inward along the second flowpath section from the inner boundary apex. The bleed port may be located radially outboard of the inner boundary apex.

A downstream edge of the bleed port may be formed by a splitter along the outer peripheral boundary of the flowpath.

A mean line of the splitter may be angularly offset from the axis by an acute angle greater than forty-five degrees.

The splitter may be a first splitter, and a second splitter may be arranged between an inlet into the inner passage and an inlet into the outer passage. A mean line of the second splitter may be angularly offset from the axis by an acute angle less than forty-five degrees.

The flowpath may include a first flowpath section and a second flowpath section. The first flowpath section may extend radially outward from the first compressor section to the second flowpath section. The second flowpath section may extend radially inwards from the first flowpath section to the second compressor section. The bleed port may be arranged along the second flowpath section.

A trajectory of the bleed port may extend radially inward as the bleed port extends longitudinally from the flowpath to an inlet into the inner passage and an inlet into the outer passage.

A trajectory of the inner passage may extend radially inward and may then extend radially outward as the inner passage extends longitudinally out from the bleed port.

A trajectory of the outer passage may extend radially outward as the outer passage extends longitudinally away from the bleed port.

A trajectory of the outer passage may extend radially inward and may then extend radially outward as the outer passage extends longitudinally out from the bleed port.

The assembly may also include a heat exchanger. The inner passage may extend from the bleed port to at least the heat exchanger.

The outer passage may extend from the bleed port to a volume outside of the engine core.

The assembly may also include a bypass flowpath downstream of the propulsor rotor. The bypass flowpath may include the volume.

The engine core may include a mixed flow compressor rotor in the first compressor section. The mixed flow compressor rotor may be configured to output compressed air along a trajectory with an axial component and a radial outward component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
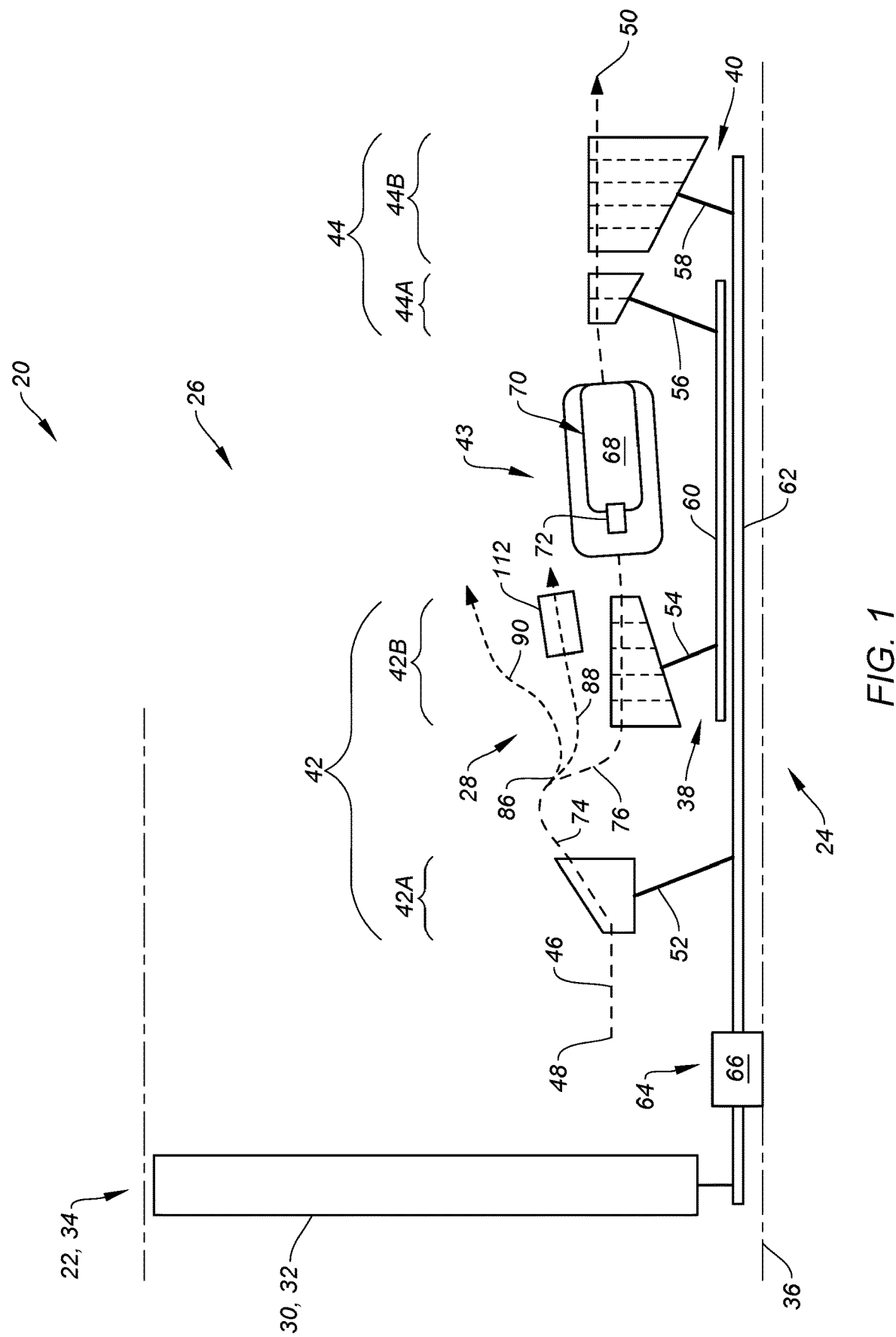
FIG. 1 is a partial schematic illustration of an aircraft system.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 may be configured as, or otherwise included as part of, a propulsion system for the aircraft. The aircraft system 20 may also or alternatively be configured as, or otherwise included as part of, an electrical power system for the aircraft. The aircraft system 20 of FIG. 1 includes a mechanical load 22 and a core 24 of a turbine engine 26. The aircraft system 20 also includes a core air system 28.

The mechanical load 22 may be configured as or otherwise include a rotor 30 mechanically driven and/or otherwise powered by the engine core 24. This driven rotor 30 may be a bladed propulsor rotor 32 (e.g., an air mover) where the aircraft system 20 is (or is part of) the aircraft propulsion system. The propulsor rotor 32 includes a plurality of rotor blades arranged circumferentially around and connected to a rotor disk hub. The propulsor rotor 32 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, of course, is not limited to the foregoing exemplary propulsor rotor arrangements. Moreover, the driven rotor 30 may alternatively be a generator rotor of an electric power generator where the aircraft system 20 is (or is part of) the aircraft power system; e.g., an auxiliary power unit (APU) for the aircraft. However, for ease of description, the mechanical load 22 may be generally described below as a propulsor section 34 of the turbine engine 26 and the driven rotor 30 may be generally described as the propulsor rotor 32 within the propulsor section 34.

The engine core 24 extends axially along an axis 36 between an upstream, forward end of the engine core 24 and a downstream, aft end of the engine core 24. This axis 36 may be a centerline axis of the turbine engine 26 and/or its engine core 24. The axis 36 may also or alternatively be a rotational axis of one or more rotating assemblies (e.g., 38 and 40) of the turbine engine 26 and its engine core 24. The engine core 24 includes a compressor section 42, a combustor section 43, a turbine section 44 and a core flowpath 46. The compressor section 42 of FIG. 1 includes a low pressure compressor (LPC) section 42A and a high pressure compressor (HPC) section 42B. The turbine section 44 of FIG. 1 includes a high pressure turbine (HPT) section 44A and a low pressure turbine (LPT) section 44B. The core flowpath 46 extends sequentially through the LPC section 42A, the HPC section 42B, the combustor section 43, the HPT section 44A and the LPT section 44B from an airflow inlet 48 into the core flowpath 46 to a combustion products exhaust 50 from the core flowpath 46. The core inlet 48 may be disposed at (e.g., on, adjacent or proximate) the forward end of the engine core 24, and the core exhaust 50 may be disposed at the aft end of the engine core 24.

The LPC section 42A includes a bladed low pressure compressor (LPC) rotor 52. The LPC rotor 52 includes a single set of compressor blades arranged circumferentially around a rotor disk, where the compressor blades are connected to and project out from the rotor disk. Here, the LPC rotor 52 and its single set of the compressor blades provide the LPC section 42A with a single compressor stage. The LPC rotor 52 is disposed in and arranged longitudinally along the core flowpath 46 between the core inlet 48 and the HPC section 42B. The compressor blades, for example, are disposed in and extend across the core flowpath 46. Each rotor disk is disposed adjacent (e.g., radially below) the core flowpath 46.

Figure 2:
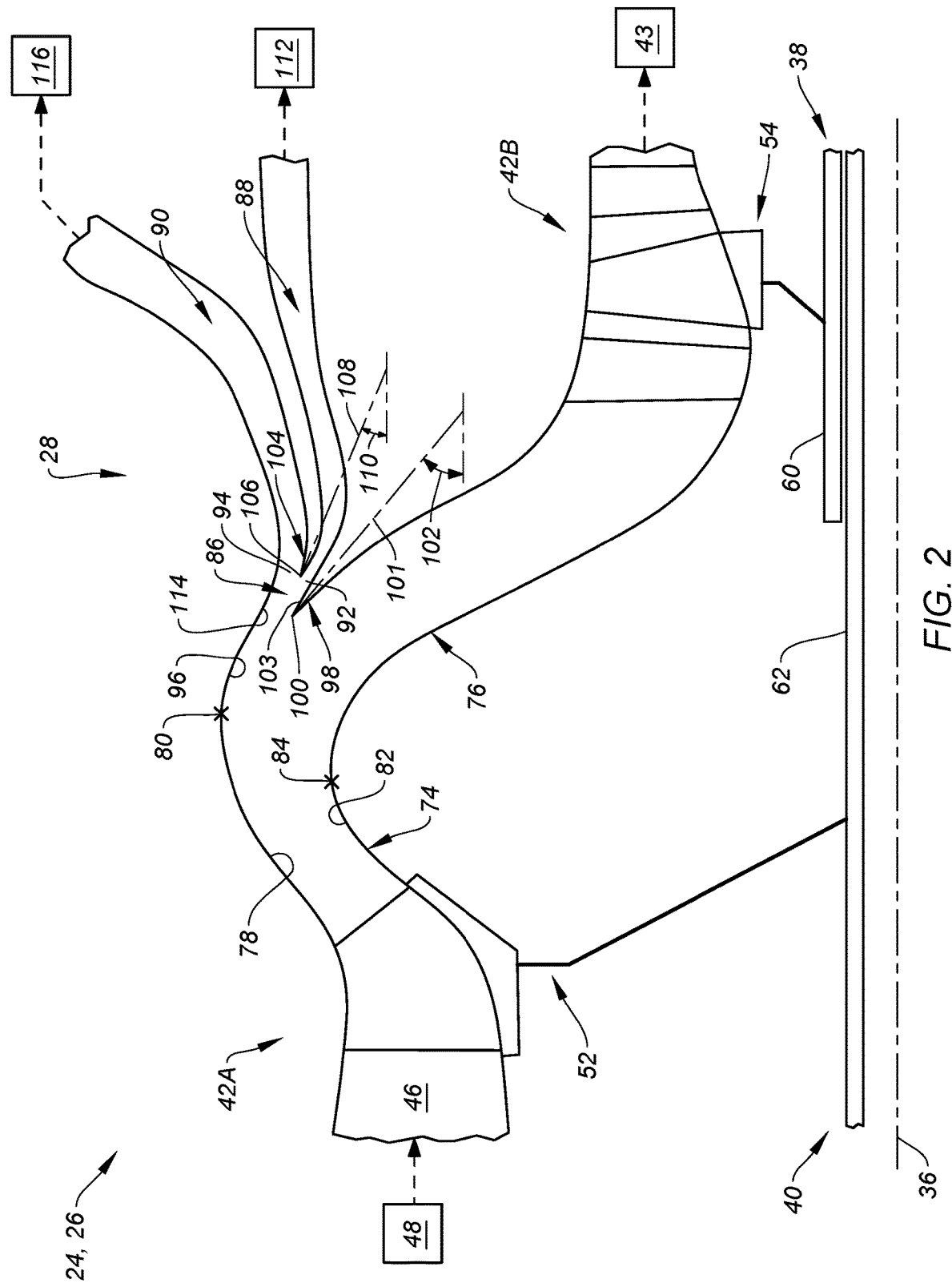
FIG. 2 is a partial schematic illustration of the aircraft system along a length of a core flowpath, between a low pressure compressor section and a high pressure compressor section, with a core air system.

Referring to FIG. 2, the LPC rotor 52 may be configured as a mixed flow compressor rotor; e.g., an axial inflow and axial/radial outflow compressor rotor. With such a configuration, the LPC rotor 52 of FIG. 2 is configured to receive incoming air along an incoming air trajectory with an axial component and without (or with a very small) radial component. During compression of this incoming air, the LPC rotor 52 of FIG. 2 is configured to turn the air and direct the outgoing compressed air along an outgoing air trajectory with an axial component and a radial component; e.g., a radial outward component. Here, a ratio of the axial component to the radial component may be between 2-to-1 and 1-to-2 (e.g., a 1-to-1 ratio). The present disclosure, however, is not limited to such an exemplary relationship nor to such an exemplary LPC rotor configuration. For example, while the LPC rotor 52 is shown as a mixed flow compressor rotor, it is contemplated the LPC rotor 52 may alternatively be configured as a radial flow compressor rotor; e.g., an axial inflow-radial outflow compressor rotor. Moreover, while the LPC section 42A is schematically shown in FIG. 1 with a single stage, the LPC section 42A may alternatively include one or more additional LPC stages axially upstream of the mixed flow compressor stage.

The HPC section 42B includes a bladed high pressure compressor (HPC) rotor 54. The HPC rotor 54 includes one or more sets of compressor blades (schematically shown) arranged circumferentially around one or more rotor disks, where the compressor blades in each set are connected to and project out from a respective one of the rotor disks. Here, the HPC rotor 54 and its multiple sets of the compressor blades provide the HPC section 42B with multiple compressor stages. The HPC rotor 54 is disposed in and arranged longitudinally along the core flowpath 46 between the LPC section 42A and the combustor section 43. The compressor blades, for example, are disposed in and extend across the core flowpath 46. Each rotor disk is disposed adjacent (e.g., radially below) the core flowpath 46. The present disclosure, however, is not limited to such an exemplary HPC rotor configuration.

The HPT section 44A includes a bladed high pressure turbine (HPT) rotor 56. The HPT rotor 56 includes one or more sets of turbine blades (schematically shown) arranged circumferentially around one or more rotor disks, where the turbine blades in each set are connected to and project out from a respective one of the rotor disks. Here, the HPT rotor 56 and its multiple sets of the turbine blades provide the HPT section 44A with multiple turbine stages. The HPT rotor 56 is disposed in and arranged longitudinally along the core flowpath 46 between the combustor section 43 and the LPT section 44B. The turbine blades, for example, are disposed in and extend across the core flowpath 46. Each rotor disk is disposed adjacent (e.g., radially below) the core flowpath 46. The present disclosure, however, is not limited to such an exemplary HPT rotor configuration.

The LPT section 44B includes a bladed low pressure turbine (LPT) rotor 58. The LPT rotor 58 includes one or more sets of turbine blades (schematically shown) arranged circumferentially around one or more rotor disks, where the turbine blades in each set are connected to and project out from a respective one of the rotor disks. Here, the LPT rotor 58 and its multiple sets of the turbine blades provide the LPT section 44B with multiple turbine stages. The LPT rotor 58 is disposed in and arranged longitudinally along the core flowpath 46 between the HPT section 44A and the core exhaust 50. The turbine blades, for example, are disposed in and extend across the core flowpath 46. Each rotor disk is disposed adjacent (e.g., radially below) the core flowpath 46. The present disclosure, however, is not limited to such an exemplary LPT rotor configuration.

The HPC rotor 54 is coupled to and rotatable with the HPT rotor 56. The HPC rotor 54 of FIG. 1, for example, are connected to the HPT rotor 56 by a high speed shaft 60. At least (or only) the HPC rotor 54, the HPT rotor 56 and the high speed shaft 60 collectively form the high speed rotating assembly 38; e.g., a high speed spool of the engine core 24. The LPC rotor 52 is coupled to and rotatable with the LPT rotor 58. The LPC rotor 52 of FIG. 1, for example, are connected to the LPT rotor 58 by a low speed shaft 62. At least (or only) the LPC rotor 52, the LPT rotor 58 and the low speed shaft 62 collectively form the low speed rotating assembly 40; e.g., a low speed spool of the engine core 24. This low speed rotating assembly 40 is further coupled to the driven rotor 30 (e.g., the propulsor rotor 32) through a drivetrain 64. The drivetrain 64 may be configured as a geared drivetrain, where a geartrain 66 (e.g., a transmission, a speed change device, an epicyclic geartrain, etc.) is disposed between and operatively couples the driven rotor 30 to the low speed rotating assembly 40 and its LPT rotor 58. With this arrangement, the driven rotor 30 may rotate at a different (e.g., slower) rotational velocity than the low speed rotating assembly 40 and its LPT rotor 58. However, the drivetrain 64 may alternatively be configured as a direct drive drivetrain, where the geartrain 66 is omitted. With this arrangement, the driven rotor 30 rotates at a common (the same) rotational velocity as the low speed rotating assembly 40 and its LPT rotor 58. Referring again to FIG. 1, each of the rotating assemblies 38, 40 and its members may be rotatable about the axis 36.

During operation of the turbine engine 26, air may be directed across the driven rotor 30 (e.g., the propulsor rotor 32) and into the engine core 24 through the core inlet 48. This air entering the core flowpath 46 may be referred to as core air. The core air is compressed by the LPC rotor 52 and the HPC rotor 54 and directed into a combustion chamber 68 (e.g., an annular combustion chamber) within a combustor 70 (e.g., an annular combustor) of the combustor section 43. Fuel is injected into the combustion chamber 68 by one or more fuel injectors 72 and mixed with the compressed core air to provide a fuel-air mixture. This fuel-air mixture is ignited and combustion products thereof flow through and sequentially drive rotation of the HPT rotor 56 and the LPT rotor 58 about the axis 36. The rotation of the HPT rotor 56 and the LPT rotor 58 respectively drive rotation of the HPC rotor 54 and the LPC rotor 52 and, thus, the compression of the air received from the core inlet 48. The rotation of the LPT rotor 58 drives rotation of the driven rotor 30. Where the driven rotor 30 is configured as the propulsor rotor 32, the rotation of that propulsor rotor 32 may propel additional air (e.g., outside air, bypass air, etc.) outside of the engine core 24 to provide aircraft thrust and/or lift. Where the driven rotor 30 is configured as the generator rotor, the rotation of that generator rotor may facilitate generation of electricity.

Referring to FIG. 2, the core air system 28 is configured to bleed a quantity of the compressed core air from a length of the core flowpath 46 (A) downstream of the LPC section 42A and its LPC rotor 52 and (B) upstream of the HPC section 42B and its HPC rotor 54. This length of the core flowpath 46 may be configured with an outward curve and/or bend. The length of the core flowpath 46 of FIG. 2, for example, includes an upstream flowpath section 74 and a downstream flowpath section 76. The upstream flowpath section 74 extends longitudinally from the LPC section 42A to the downstream flowpath section 76. This upstream flowpath section 74 also extends radially outward (e.g., away from the axis 36) as the upstream flowpath section 74 extends longitudinally from (or about) the LPC section 42A and to (or about) the upstream flowpath section 74. The downstream flowpath section 76 extends longitudinally from the upstream flowpath section 74 to the HPC section 42B. This downstream flowpath section 76 also extends radially inward (e.g., towards the axis 36) as the downstream flowpath section 76 extends longitudinally from (or about) the upstream flowpath section 74 and to (or about) the HPC section 42B.

With the foregoing arrangement, an outer peripheral boundary 78 of the core flowpath 46 extends radially outward along the upstream flowpath section 74 from the LPC section 42A and its LPC rotor 52 to an outer boundary apex 80. The outer peripheral boundary 78 of the core flowpath 46 then extends radially inward along the downstream flowpath section 76 from the outer boundary apex 80 to the HPC section 42B and its HPC rotor 54. Similarly, an inner peripheral boundary 82 of the core flowpath 46 extends radially outward along the upstream flowpath section 74 from the LPC section 42A and its LPC rotor 52 to an inner boundary apex 84. The inner peripheral boundary 82 of the core flowpath 46 then extends radially inward along the downstream flowpath section 76 from the inner boundary apex 84 to the HPC section 42B and its HPC rotor 54. Here, the inner boundary apex 84 is axially offset (e.g., forward) from the outer boundary apex 80. In other embodiments, however, the inner boundary apex 84 may be axially aligned with the outer boundary apex 80.

The core air system 28 of FIG. 2 includes a bleed port 86, an inner passage 88 and an outer passage 90. The bleed port 86 is configured to fluidly couple the core flowpath 46 to the inner passage 88 and the outer passage 90. The bleed port 86 of FIG. 2, for example, fluidly couples the downstream flowpath section 76 to an inlet 92 into the inner passage 88 and an inlet 94 into the outer passage 90 in parallel. Here, the bleed port 86 has a trajectory which extends radially inwards as the bleed port 86 extends longitudinally from the core flowpath 46 to the passage inlets 92 and 94. The bleed port 86 is located downstream and radially inboard of the outer boundary apex 80. The bleed port 86 is located downstream and radially outboard of the inner boundary apex 84.

The bleed port 86 may be formed by a section 96 of an outer flowpath wall and a core air splitter 98. The bleed port 86 of FIG. 2, for example, is formed by a longitudinal gap formed by and extending between a downstream end of the outer flowpath wall section 96 and a leading edge 100 of the core air splitter 98. The outer flowpath wall section 96 forms a portion of the outer peripheral boundary 78 of the core flowpath 46 longitudinally adjacent and upstream of the bleed port 86. The core air splitter 98 forms a portion of the outer peripheral boundary 78 of the core flowpath 46 longitudinally adjacent and downstream of the bleed port 86. This core air splitter 98 of FIG. 2 is configured with a wedge-shaped (e.g., triangular) sectional geometry when viewed, for example, in a reference plane parallel with (e.g., including) the axis 36. A mean line 101 of the core air splitter 98 is angularly offset from the axis 36 by an included offset angle 102; e.g., a non-zero acute angle. This offset angle 102 may be equal to or greater than forty-five degrees (45°); e.g., equal to or greater than sixty or sixty-five degrees (60°, 65°).

The inlet 92 into the inner passage 88 may be formed by an inner wall 103 of the bleed port 86 and a bleed air splitter 104. The inner passage inlet 92 of FIG. 2, for example, is formed by a gap formed by and extending between a downstream end of the port inner wall 103 and a leading edge 106 of the bleed air splitter 104. The port inner wall 103 forms an inner peripheral boundary of the bleed port 86. The bleed air splitter 104 of FIG. 2 is configured with a wedge-shaped (e.g., triangular) sectional geometry when viewed, for example, in the reference plane. A mean line 108 of the bleed air splitter 104 is angularly offset from the axis 36 by an included offset angle 110; e.g., a non-zero acute angle. This offset angle 110 may be equal to or less than forty-five degrees (45°); e.g., equal to or less than thirty or thirty-five degrees (30°, 35°). The offset angle 110 is thereby less than the offset angle 102. The offset angle 110, for example, may be N number of degrees less than the offset angle 102, where the N number of degrees is between five and fifteen degrees (5-15°), between fifteen and thirty degrees (15-30°), or more than thirty degrees (30°). Here, the leading edge 106 of the bleed air splitter 104 is located axially aft and radially inboard of the leading edge 100 of the core air splitter 98. However, in other embodiments, the leading edge 106 of the bleed air splitter 104 may be radially aligned with the leading edge 100 of the core air splitter 98.

The inner passage 88 is configured to fluidly couple the bleed port 86 to another component of the turbine engine 26. The inner passage 88 of FIG. 2, for example, fluidly couples an outlet from the bleed port 86 to a heat exchanger 112 for the turbine engine 26. The inner passage 88 of FIG. 2, in particular, extends longitudinally from the outlet from the bleed port 86 to an inlet into a flowpath through the heat exchanger 112. The present disclosure, however, is not limited to such an exemplary arrangement. For example, the heat exchanger 112 may alternatively be disposed within the inner passage 88, or a section of the inner passage 88 may be formed by and extend through the heat exchanger 112. Referring again to FIG. 2, the inner passage 88 has a trajectory which extends radially inwards and then turns (e.g., curves) and extends radially outwards as the inner passage 88 extends longitudinally from the bleed port 86 and its outlet towards the heat exchanger 112.

The inlet 94 into the outer passage 90 may be formed by an outer wall 114 of the bleed port 86 and the bleed air splitter 104. The outer passage inlet 94 of FIG. 2, for example, is formed by a gap formed by and extending between a downstream end of the port outer wall 114 and the leading edge 106 of the bleed air splitter 104. The port outer wall 114 forms an outer peripheral boundary of the bleed port 86.

The outer passage 90 is configured to fluidly couple the bleed port 86 to a volume 116 outside of the engine core 24. The outer passage 90 of FIG. 2, for example, fluidly couples the outlet from the bleed port 86 to the volume 116; e.g., a bypass flowpath downstream of the propulsor rotor 32 (e.g., a fan rotor) of FIG. 1, an environment external to the aircraft system 20, etc. The outer passage 90 of FIG. 2 has a trajectory which extends radially inwards and then turns (e.g., curves) and extends radially outwards as the outer passage 90 extends longitudinally from the bleed port 86 and its outlet towards the volume 116. Alternatively, it is contemplated the outer passage trajectory may extend substantially axially out from the outlet from the bleed port 86 before turning radially outward, or extend radially outward from the outlet from the bleed port 86.

During operation of the core air system 28, the core air compressed by the LPC section 42A is propelled axially aft and radially outward by the LPC rotor 52 into the upstream flowpath section 74. During certain operational conditions, this core air may carry debris such as sand, dirt, or other foreign matter ingested by the turbine engine 26. As the compressed core air is turned radially inward by the outer flowpath wall section 96 following the outer boundary apex 80, the relatively heavy debris may move along the outer peripheral boundary 78 of the core flowpath 46 and into the bleed port 86 along with a quantity of the compressed core air-bleed air. The core air system 28 may thereby separate the debris from the remaining compressed core air directed further downstream along the core flowpath 46 into the HPC section 42B. In addition, within the bleed port 86, the debris may move along the port outer wall 114 and into the outer passage 90 with a first quantity of the bleed air. The outer passage 90 may direct the debris and the first quantity of the bleed air out of the engine core 24 and into the volume 116 for removal from the turbine engine 26. A second quantity of the bleed air (e.g., substantially without any of the debris) may flow into the inner passage 88. The inner passage 88 may direct the second quantity of the bleed air to the heat exchanger 112 to cool (or alternatively heat) another working fluid (e.g., core air bled from the core flowpath 46 downstream of the HPC section 42B, engine oil, fuel, or the like). Following use in the heat exchanger 112, the second quantity of the bleed air may be used for air cooling one or more other components of the turbine engine 26 and/or vented from the engine core 24; e.g., into the volume 116.

Figure 3:
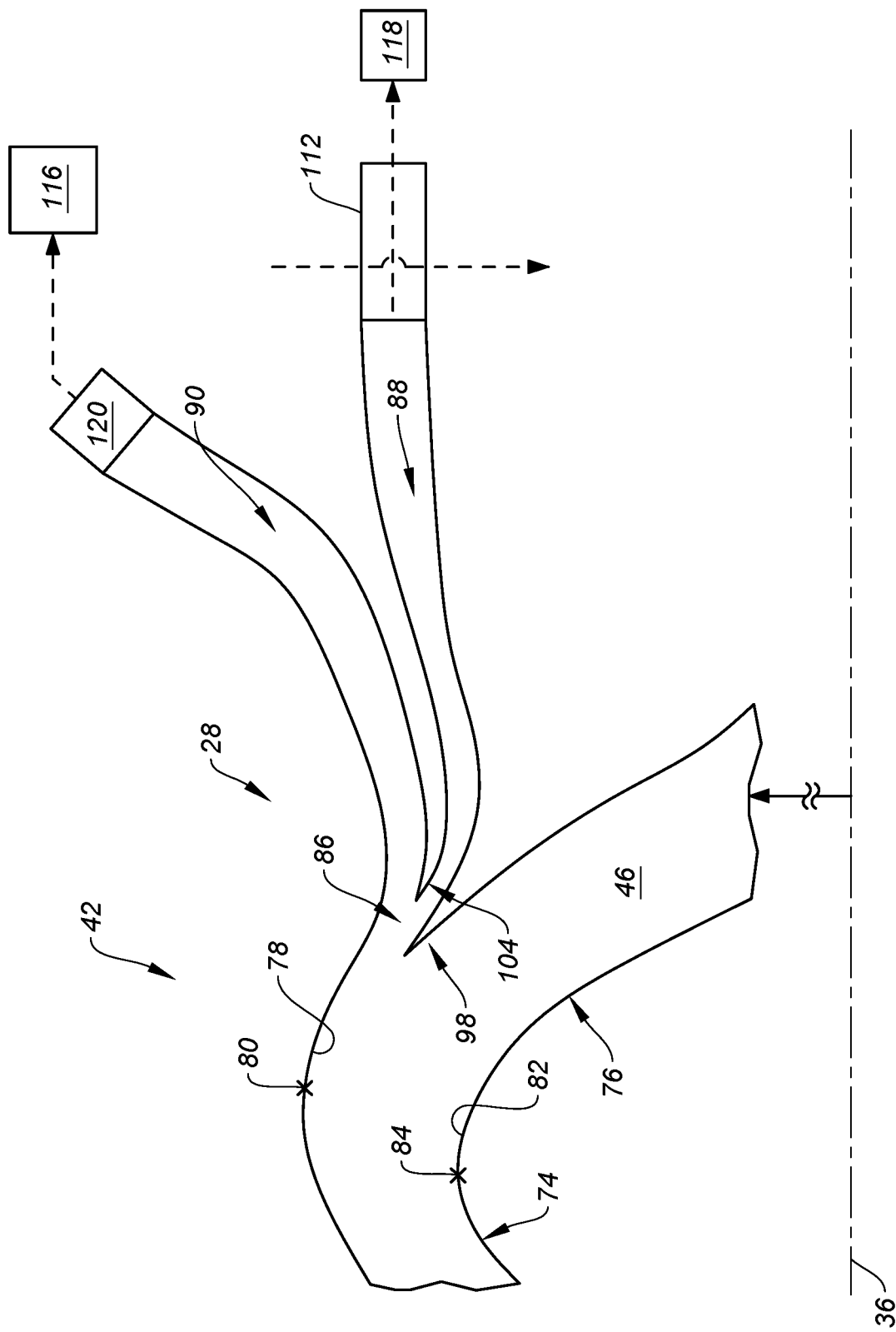
FIG. 3 is a partial schematic illustration of the aircraft system at the core air system with one or more flow regulators.

In some embodiments, referring to FIG. 3, the core air system 28 may include a flow regulator 118 (e.g., a valve, etc.) for the inner passage 88. The inner passage flow regulator 118 of FIG. 3 is configured to regulate (e.g., open, increase, close, decrease) the flow of the bleed air through the inner passage 88. For example, when the working fluid needs additional cooling (or heating), the inner passage flow regulator 118 may open or increase flow therethrough to start or increase heat exchange through the heat exchanger 112 between the bleed air and the working fluid. By contrast, when the working fluid needs less cooling (or heating), the inner passage flow regulator 118 may close or decrease flow therethrough to stop or decrease heat exchange through the heat exchanger 112 between the bleed air and the working fluid. Here, the inner passage flow regulator 118 is arranged downstream of the heat exchanger 112. However, in other embodiments, the inner passage flow regulator 118 may alternatively be arranged longitudinally along the inner passage 88 between the bleed port 86 and the heat exchanger 112.

In some embodiments, the core air system 28 may include a flow regulator 120 (e.g., a valve, etc.) for the outer passage 90. The outer passage flow regulator 120 of FIG. 3 is configured to regulate (e.g., open, increase, close, decrease) the flow of the bleed air through the outer passage 90. For example, where the aircraft is flying through an environment with a relatively high quantity of debris in the air, the outer passage flow regulator 120 may open or increase flow therethrough to facilitate separation of the debris from the core air directed into the HPC section 42B (see FIG. 2). By contrast, where the aircraft is flying through an environment with a relatively low quantity of debris in the air, the outer passage flow regulator 120 may close or decrease flow therethrough such that additional core air remains within the core flowpath 46. Here, the outer passage flow regulator 120 is arranged longitudinally along the outer passage 90 between the bleed port 86 and the volume 116.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
an engine core configured to drive rotation of a propulsor rotor, the engine core including a first compressor section, a second compressor section, a flowpath, a bleed port, an inner passage and an outer passage;
the first compressor section and the second compressor section arranged axially along an axis;
the flowpath extending longitudinally through the first compressor section and the second compressor section;
the bleed port fluidly coupling the flowpath to the inner passage and the outer passage in parallel, and the bleed port located longitudinally along the flowpath between the first compressor section and the second compressor section;
the inner passage arranged radially between the flowpath and the outer passage; and
a trajectory of the bleed port extending radially inward as the bleed port extends longitudinally from the flowpath to an inlet into the inner passage and an inlet into the outer passage;
wherein at least one of
a trajectory of the outer passage extends radially outward as the outer passage extends longitudinally away from the bleed port; or
a trajectory of the outer passage extends radially inward and then extends radially outward as the outer passage extends longitudinally out from the bleed port.

2. The assembly of claim 1, wherein
the flowpath includes a first flowpath section and a second flowpath section;
the first flowpath section extends radially outward from the first compressor section to the second flowpath section;
the second flowpath section extends radially inwards from the first flowpath section to the second compressor section; and
the bleed port is arranged along the second flowpath section.

3. The assembly of claim 1, wherein the trajectory of the inner passage extends radially inward and then extends radially outward as the inner passage extends longitudinally out from the bleed port.

4. The assembly of claim 1, wherein the trajectory of the outer passage extends radially outward as the outer passage extends longitudinally away from the bleed port.

5. The assembly of claim 1, wherein the trajectory of the outer passage extends radially inward and then extends radially outward as the outer passage extends longitudinally out from the bleed port.

6. The assembly of claim 1, further comprising:
a heat exchanger;
the inner passage extending from the bleed port to at least the heat exchanger.

7. The assembly of claim 1, wherein the outer passage extends from the bleed port to a volume outside of the engine core.

8. The assembly of claim 7, further comprising a bypass flowpath downstream of the propulsor rotor, wherein the bypass flowpath comprises the volume.

9. The assembly of claim 1, wherein
the engine core comprises a mixed flow compressor rotor in the first compressor section; and
the mixed flow compressor rotor is configured to output compressed air along a trajectory with an axial component and a radial outward component.

10. An assembly for a turbine engine, comprising:
an engine core configured to drive rotation of a propulsor rotor, the engine core including a first compressor section, a second compressor section, a flowpath, a bleed port, an inner passage and an outer passage;
the first compressor section and the second compressor section arranged axially along an axis;
the flowpath extending longitudinally through the first compressor section and the second compressor section;
the bleed port fluidly coupling the flowpath to the inner passage and the outer passage in parallel, and the bleed port located longitudinally along the flowpath between the first compressor section and the second compressor section;
the inner passage arranged radially between the flowpath and the outer passage;
the flowpath including a first flowpath section and a second flowpath section, the first flowpath section extending longitudinally from the first compressor section to the second flowpath section, and the second flowpath section extending longitudinally from the first flowpath section to the second compressor section;

an outer peripheral boundary of the flowpath extending radially outward along the first flowpath section to an outer boundary apex and then extending radially inward along the second flowpath section from the outer boundary apex; and the bleed port arranged along the outer peripheral boundary of the flowpath downstream of the outer boundary apex.

11. The assembly of claim 10, wherein the bleed port is located radially inboard of the outer boundary apex.

12. The assembly of claim 10, wherein an inner peripheral boundary of the flowpath extends radially outward along the first flowpath section to an inner boundary apex and then extends radially inward along the second flowpath section from the inner boundary apex; and the bleed port is located radially outboard of the inner boundary apex.

13. The assembly of claim 10, wherein a downstream edge of the bleed port is formed by a splitter along the outer peripheral boundary of the flowpath.

14. The assembly of claim 13, wherein a mean line of the splitter is angularly offset from the axis by an acute angle greater than forty-five degrees.

15. The assembly of claim 14, wherein the splitter is a first splitter, and a second splitter is arranged between an inlet into the inner passage and an inlet into the outer passage; and a mean line of the second splitter is angularly offset from the axis by an acute angle less than forty-five degrees.

16. An assembly for a turbine engine, comprising:

an engine core including a compressor section, a flowpath, a bleed port, an outer passage and an inner passage disposed radially between the flowpath and the outer passage;

the flowpath extending longitudinally through the compressor section, the flowpath including a first flowpath section and a second flowpath section, the first flowpath section extending longitudinally to the second flowpath section, and the second flowpath section extending longitudinally from the first flowpath section to the compressor section;

an outer peripheral boundary of the flowpath extending radially outward along the first flowpath section to an outer boundary apex and then extending radially inward along the second flowpath section from the outer boundary apex;

an inner peripheral boundary of the flowpath extending radially outward along the first flowpath section to an inner boundary apex and then extending radially inward along the second flowpath section from the inner boundary apex; and the bleed port fluidly coupling the flowpath to the inner passage and the outer passage in parallel, the bleed port arranged along the outer peripheral boundary of the flowpath downstream of the outer boundary apex, and the bleed port located radially outboard of the inner boundary apex.

17. The assembly of claim 16, wherein the compressor section comprises a high pressure compressor section, the engine core further includes a low pressure compressor section, and the flowpath further extends longitudinally through the low pressure compressor section; and the first flowpath section and the second flowpath section are arranged longitudinally between the low pressure compressor section and the high pressure compressor section.

18. The assembly of claim 17, wherein the engine core further includes a rotating assembly with a mixed flow compressor rotor in the low pressure compressor section.

* * * * *